United States Patent
Endou et al.

(10) Patent No.: US 8,388,414 B2
(45) Date of Patent: Mar. 5, 2013

(54) APPARATUS FOR CLEANING MAGNETIC DISKS AND METHODS FOR MANUFACTURING MAGNETIC DISKS

(75) Inventors: Naoto Endou, Kanagawa (JP); Mitsuhiro Shoda, Kanagawa (JP); Toshinori Ono, Tokyo (JP); Hiroyuki Matsumoto, Kanagawa-ken (JP); Fumihito Takahashi, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 679 days.

(21) Appl. No.: 12/568,437

(22) Filed: Sep. 28, 2009

(65) Prior Publication Data

US 2010/0086676 A1   Apr. 8, 2010

(30) Foreign Application Priority Data

Oct. 7, 2008 (JP) .................... 2008-260296

(51) Int. Cl.
*B08B 1/02* (2006.01)

(52) U.S. Cl. ............ 451/164; 451/8; 451/168; 451/172; 15/97.1; 15/102

(58) Field of Classification Search .............. 15/97.1, 15/100, 102; 451/8, 164, 168, 172, 173
See application file for complete search history.

(56) References Cited

U.S. PATENT DOCUMENTS

| | | | | |
|---|---|---|---|---|
| 5,188,310 A | * | 2/1993 | Rotter | 242/342 |
| 5,349,485 A | * | 9/1994 | Lin et al. | 360/85 |
| 5,642,550 A | * | 7/1997 | Maruyama et al. | 15/102 |
| 6,231,681 B1 | * | 5/2001 | Kubota et al. | 134/9 |
| 6,243,904 B1 | * | 6/2001 | Kubota et al. | 15/100 |
| 7,175,129 B2 | * | 2/2007 | Rudi | 242/578 |
| 7,458,283 B2 | * | 12/2008 | Nacson et al. | 73/863.12 |
| 8,131,175 B2 | * | 3/2012 | Kim | 399/71 |
| 2001/0011397 A1 | * | 8/2001 | Kubota et al. | 15/100 |
| 2007/0042228 A1 | | 2/2007 | Kusakawa et al. | 428/835.6 |
| 2009/0065029 A1 | * | 3/2009 | Watanabe et al. | 134/15 |

FOREIGN PATENT DOCUMENTS

| | | |
|---|---|---|
| JP | 59/148134 | 8/1984 |
| JP | 02/083823 | 3/1990 |
| JP | 2000/348337 | 12/2000 |
| JP | 2001/067655 | 3/2001 |
| JP | 2002/319127 | 10/2002 |
| JP | 2003/136389 | 5/2003 |
| JP | 2007/058935 | 3/2007 |

* cited by examiner

*Primary Examiner* — Mark Spisich
*Assistant Examiner* — Michael Jennings
(74) *Attorney, Agent, or Firm* — Zilka-Kotab, PC

(57) ABSTRACT

A method, according to one embodiment, includes forming a lubricant film on a magnetic disk having at least a magnetic recording film above a substrate, and a protective film above the magnetic recording film, and wiping the lubricant film while rotating the substrate, e.g., at about 3.0 m/s to about 3.5 m/s by pressing a pad against a wiping cloth e.g., at a loading speed of about 12 mm/min to about 36 mm/min e.g., under a pressure of about 3 gf/mm² to about 9 gf/mm². The pad has a convexly curved surface in contact with the wiping cloth, and the wiping cloth is disposed so as to oppose the lubricant film. The method also includes pressing a cleaning tape which includes abrasive grains against the substrate on which the protective film and lubricant film are formed while rotating the substrate to remove protrusions. Apparatuses and forming the layers are also described.

19 Claims, 13 Drawing Sheets

RUBBER ROLLER
(PRIOR-ART ARRANGEMENT)
CONTACT AREA: 1 × 10 = 10 mm²

FLAT TYPE
(COMPARATIVE EXAMPLE)
CONTACT AREA: 5 × 4 = 20 mm²

SEMI-CIRCULAR TYPE
(EMBODIMENT)
CONTACT AREA: 1 × 10 = 10 mm²

APPARATUS FOR CLEANING MAGNETIC DISKS AND METHODS FOR MANUFACTURING MAGNETIC DISKS

RELATED APPLICATIONS

The present application claims priority from a Japanese Patent Application filed Oct. 7, 2008 under Appl. No. 2008-260296, which is incorporated herein by reference.

FIELD OF THE INVENTION

The present invention relates in general to a method for manufacturing a magnetic disk and, more particularly, to a method for removing stain of a lubricant locally present on a magnetic disk surface. The present invention also relates to an apparatus for cleaning the magnetic disk.

BACKGROUND OF THE INVENTION

With the development of the information industry, performance requirements for magnetic disk drives have become more sophisticated and more demanding at an accelerated pace. There is a mounting need in the magnetic disk field for a magnetic recording medium capable of reduced size, higher recording densities, and greater reliability.

Typically, a magnetic disk is manufactured using, for example, a glass substrate with fine concentric lines (hereinafter referred to as a "texture") made on a mirror-polished surface thereof. The glass substrate is then introduced to a vacuum system and an underlayer, a magnetic layer, and a protective layer are formed in sequence through sputtering or some other layer formation method. The surface is then coated with a lubricant and cleaned. In order to reduce spacing between a read/write magnetic head and a magnetic disk, which is indispensable for meeting the recent trend toward higher recording densities, reduction in the surface roughness of the glass substrate is becoming more important, e.g., down to about 2 nm in terms of protrusion height (hereinafter referred to as "Rp") and about 0.4 nm or less in terms of centerline average roughness (hereinafter referred to as "Ra"). There is another need, on the other hand, for an even greater reduction in the amount of dust and dirt that hampers flying of the magnetic head or an abnormal protrusion exceeding a flying height of the magnetic head. In addition, the permissible size of minor damage (hereinafter referred to as a "scratch") causing a read/write error is becoming extremely small.

To achieve a reduction in the flying height, a cleaning method is known, in which a tape film having abrasive grains fixed on an abrasive layer (hereinafter referred to as a "cleaning tape") is pressed against the magnetic disk surface through various techniques. For example, one technique for pressing uses a rubber roller as disclosed in Japanese Patent Office (JPO) Pub. Nos. JP-B-6-52568 and JP-A-2003-136389. Another technique for pressing uses foam as disclosed in JPO Pub. No. JP-A-200'-67655. Still another technique for pressing uses a wiping member that is applied to stroke a lubricant on the magnetic disk surface to thereby eliminate irregularities on a lubricant surface to form a flat surface, which is followed by a tape burnishing process to remove protrusions and dust and dirt as disclosed in JPO Pub. No. JP-A-2-83823. A further known technique uses a cleaning tape as disclosed in JPO Pub. No. JP-A-2000-348337. The cleaning tape has a surface configuration of deep chip pockets and small-diameter abrasive grains. These arrangements are known to help minimize scratches and efficiently remove abnormal protrusions. A still further technique incorporates, as disclosed in JPO Pub. No. JP-A-2002-319127, a pressure suspension system in which a sponge material that is narrower in width than a tape which presses the tape. This results in no load being applied to burr portions on tape ends and eliminates the chance of air directly scattering contaminants across the tape surface. This inhibits occurrence of contamination and reduces the number of minor errors and scratches.

It has been found recently that, in addition to the dust and dirt or the abnormal protrusions that hamper flying the head above the magnetic disk, the lubricant applied to the magnetic disk surface, if deposited on the magnetic head, can impede low flying stability of the magnetic head.

JPO Pub. No. JP-A-2007-58935 discloses a technique, in which a liquid lubricant is applied to a protective layer and, while a magnetic recording medium is being rotated, a processing tape containing solvent therein is simultaneously pressed against an end face and an outer peripheral portion of a data surface of the magnetic recording medium using a tape pressing tool, so that the liquid lubricant can be wiped off. Film thickness of a lubricant layer on the outer peripheral portion of the magnetic recording medium is thereby held to be uniform in thickness, so that the magnetic head can fly in a stable manner.

SUMMARY OF THE INVENTION

A method, according to one embodiment, includes forming a lubricant film on a magnetic disk having at least a magnetic recording film above a substrate, and a protective film above the magnetic recording film, and wiping the lubricant film while rotating the substrate e.g., at about 3.0 m/s to about 3.5 m/s by pressing a pad against a wiping cloth e.g., at a loading speed of about 12 mm/min to about 36 mm/min e.g., under a pressure of about 3 gf/mm$^2$ to about 9 gf/mm$^2$. The pad has a convexly curved surface in contact with the wiping cloth, and the wiping cloth is disposed so as to oppose the lubricant film. The method also includes pressing a cleaning tape which includes abrasive grains against the substrate on which the protective film and lubricant film are formed while rotating the substrate to remove protrusions.

An apparatus, according to one embodiment, includes a mechanism for supporting and rotating a magnetic disk, and at least one pair of mechanisms for wiping or tape-cleaning both sides of the magnetic disk. Each of the pair of mechanisms includes a feed reel and a take-up reel for a wiping cloth or a cleaning tape, a plurality of guide rollers between the feed reel and the take-up reel for guiding the wiping cloth or the cleaning tape onto a surface of the magnetic disk, a mechanism for controlling tension in the wiping cloth or the cleaning tape between the guide rollers to a predetermined level, a pressure mechanism for pressing a pad mounted with a strain gage sensor against the wiping cloth or the cleaning tape guided onto the surface of the magnetic disk, and a control mechanism for controlling a pressure on the pad at least partially based on a strain output of the strain gage sensor.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

Figure 1:
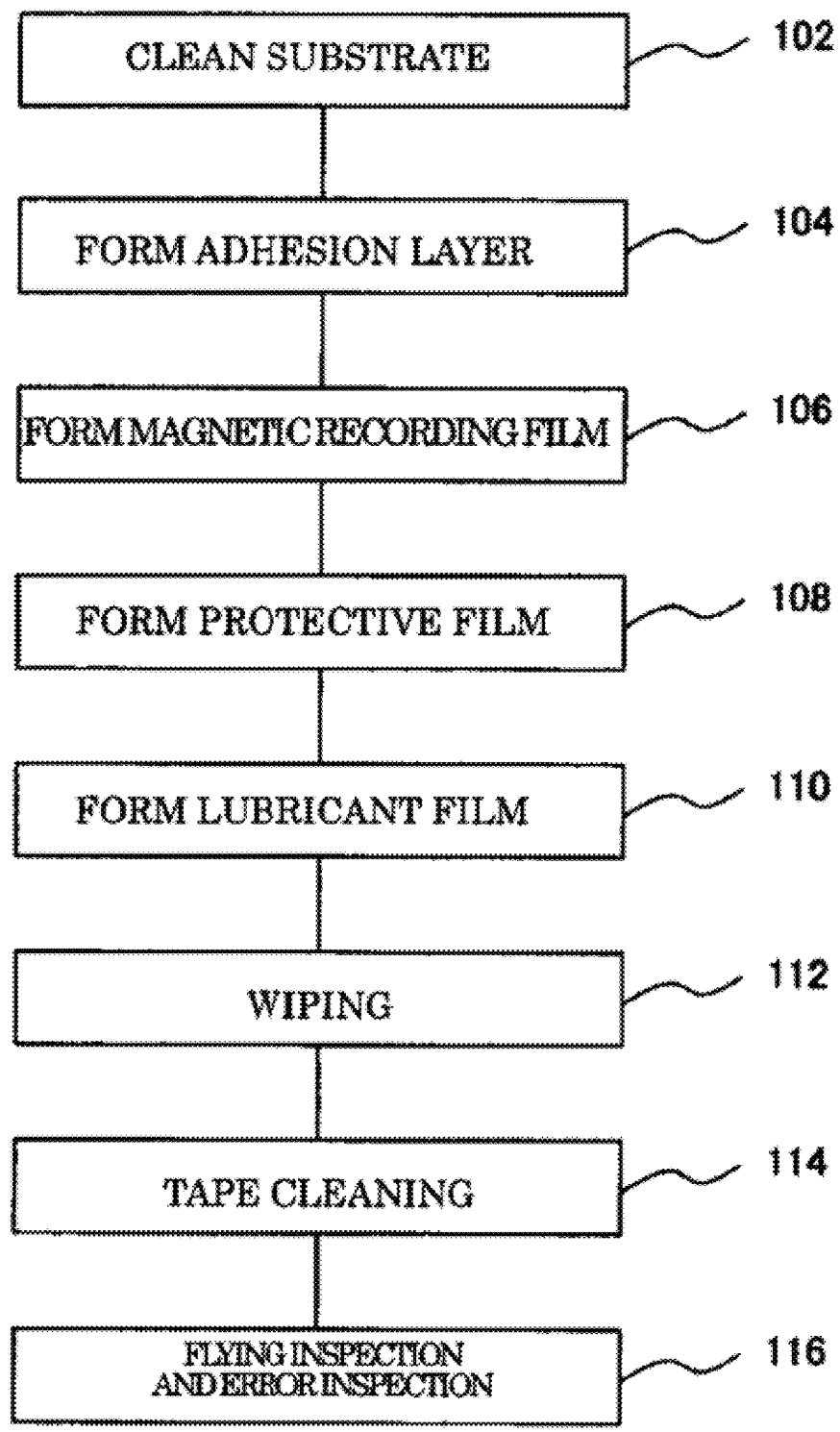
FIG. 1 is a process flow diagram showing a method for manufacturing a magnetic disk according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In more recent magnetic disk manufacturing processes, criteria for permissible protrusion defects for achieving a reduced spacing and greater reliability have become even more stringent. The perpendicular magnetic recording medium is formed to include a number of layers, including an adhesion layer, a soft magnetic layer, an underlayer, a magnetic layer, and a protective layer stacked one on top of another on a substrate. The layers of the perpendicular magnetic recording medium are therefore several times as thick as those of the longitudinal magnetic recording medium. There is, therefore, a better chance of protrusions occurring on the surface of the disk that serve as an impediment to flying occurring through sputtering and then growing abnormally. Therefore, a method for manufacturing a magnetic disk that, in a tape cleaning process for magnetic disk surfaces of perpendicular magnetic recording media in which scratches tend to occur more often, efficiently removes fine protrusions that serve as an impediment to flying and inhibits minor damage (scratches) on the magnetic disk surface that can be a read signal error. Subsequent mass production processes, however, have posed a new problem. Specifically, in an error inspection process for read/write output signals performed using an inspection magnetic head after the multiple layers have been formed of the magnetic disk, a phenomenon has been observed in which a read output was reduced when the number of magnetic disks to be inspected accumulated. If the read output of the error inspection magnetic head is reduced, an error inspection pass rate is reduced, resulting in a reduced yield.

According to one embodiment, a method for manufacturing a magnetic disk that efficiently removes fine protrusions while inhibiting occurrence of minor damage (scratches) on a magnetic disk surface and that does not allow a read output of an inspection magnetic head to be reduced is provided.

In another embodiment, a cleaning apparatus that wipes lubricant aggregating locally on a magnetic disk surface and efficiently remove fine protrusions while inhibiting the occurrence of minor damage (scratches) is provided.

A method for manufacturing a magnetic disk, according to one embodiment, includes: forming a magnetic recording film, a protective film, and a lubricant film above a substrate; wiping the lubricant film while rotating the substrate e.g., at about 3.0 m/s to about 3.5 m/s by pressing a pad against a wiping cloth e.g., at a loading speed of about 12 mm/min to about 36 mm/min, and e.g., under a pressure of about 3 gf/mm$^2$ to about 9 gf/mm$^2$, the pad having a convexly curved surface in contact with the wiping cloth and the wiping cloth being disposed so as to oppose the lubricant film; and pressing a cleaning tape including abrasive grains against a side of the substrate to remove protrusions while rotating the substrate.

According to one preferred embodiment, the pad may be semi-circular, and the pad is comprised of an ester-based polyurethane rubber having a hardness of about 20 degrees to about 40 degrees.

In another preferred embodiment, the wiping cloth may comprise a woven fabric of at least a polyester fiber and a nylon fiber.

To achieve another object of the present invention, according to one embodiment, an apparatus for cleaning a magnetic disk includes a mechanism for supporting and rotating a magnetic disk and at least a pair of mechanisms for wiping or tape-cleaning both sides of the magnetic disk. Each of the pair of mechanisms includes: a feed reel and a take-up reel for a wiping cloth or a cleaning tape; a plurality of guide rollers between the feed reel and the take-up reel for guiding the wiping cloth or the cleaning tape onto a surface of the magnetic disk; a mechanism for controlling tension in the wiping cloth or the cleaning tape between the guide rollers to a predetermined level; a pressure mechanism for pressing a pad mounted with a strain gage sensor against the wiping cloth or the cleaning tape guided onto the surface of the magnetic disk; and a control mechanism for controlling a pressure on the pad based on a strain output of the strain gage sensor.

If the pair of mechanisms is disposed so as to wipe both sides of the magnetic disk, the wiping cloth may be wound around the feed reel and the pad may include a convexly curved surface that is in contact with the wiping cloth.

In some preferred embodiments, the pad may be semicircular and may be an ester-based polyurethane rubber having a hardness of about 20 degrees to about 40 degrees. Also, in some preferable embodiments, the wiping cloth may be a woven fabric of at least a polyester fiber and a nylon fiber. Of course, other fibers may be used as well.

The control mechanism may detect a strain output from the strain gage sensor, convert the strain output to a corresponding voltage signal, and feed the signal back to a servomotor, and thereby control the pressure of the pad to a predetermined value.

Of course, the control mechanism and the pressure mechanism may be integrated as the same mechanism, be separate mechanisms, be disposed in separate locations, etc. In fact, the functionality of the control mechanism may be a part of the pressure mechanism, in which case descriptions of the pressure mechanism and the control mechanism would be describing different aspects of the same device.

Two sets of the pair of mechanisms may be disposed around the magnetic disk such that each pair has one pad above and one pad below the magnetic disk, one for wiping both sides of the magnetic disk and the other for tape-cleaning both sides of the magnetic disk.

In accordance with some approaches, a method may be provided for manufacturing a magnetic disk that efficiently removes fine protrusions while inhibiting occurrence of minor damage (scratches) on the magnetic disk surface and that does not allow the read output of the inspection magnetic head to be reduced.

Further, a cleaning apparatus can be provided that wipes lubricant aggregating locally on the magnetic disk surface and efficiently removes fine protrusions while inhibiting occurrence of minor damage (scratches).

A method for manufacturing a magnetic disk and an apparatus for cleaning a magnetic disk surface according to one embodiment is described below with reference to the accompanying drawings. Drawings to be cited in the description that follows may show an enlarged view of, for example, a characteristic portion in order to illustrate characteristics of the corresponding portion for ease of understanding, in which case dimensions of different parts of the portion do not represent actual dimension values. The description that follows also presents materials used for the layers that make up the magnetic disk. It should, however, be understood that the materials and arrangements are not the only possible choices and arrangements and materials of the layers may be properly selected according to intended purposes and performance.

According to one approach, the reduced output observed in testing was estimated to be due to flying performance of the inspection magnetic head becoming unstable as the inspection magnetic head flew above the magnetic disk and moved, specifically, due to fluctuations in the flying height between the inspection magnetic head and the magnetic disk. It is further assumed that the fluctuations in the flying height may be attributable to foreign matter of some sort intervening between the inspection magnetic head and the magnetic disk. An inspection conducted for a possible magnetic deficiency (error) revealed, during an observation of a flying surface of the inspection magnetic head that exhibited a reduced read output, that lubricant was deposited on the flying surface.

Next, investigations into possible causes for the lubricant depositing on the inspection magnetic head were performed. An observation made of the magnetic disk surface using an optical surface analyzer manufactured by KLATencor (hereinafter referred to as "Candela 6120") showed that lubricant aggregated (stained) in a circumferential form locally on an outer peripheral end portion of the magnetic disk and evidently the inspection magnetic head glided and slid over the lubricant aggregated portion. It can therefore be estimated that the lubricant stuck to the inspection magnetic head as the inspection magnetic head moved over the lubricant aggregated portion. The inventors therefore examined possible cleaning methods in order to remove the lubricant stain on the outer peripheral end of the magnetic disk. As a result, the inventors found that a wiping cloth that is a woven fabric of polyester and nylon was effective in wiping the surface completely clean of the lubricant stain, when the prior art cleaning tape to which an alumina abrasive grain was fixed was not able to remove the lubricant stain completely.

Based on the foregoing findings, in accordance with one embodiment, a cleaning process follows two steps of cleaning: wiping the magnetic disk surface clean of the stain that is the lubricant locally aggregated using a wiping cloth; and effectively removing protrusions by cleaning the surface with a cleaning tape to which an alumina abrasive grain is fixed. This effectively removes protrusions without allowing the read output of the inspection magnetic head to be reduced and scratches to occur. One embodiment is described in detail below with reference to the accompanying drawings.

Figure 2:
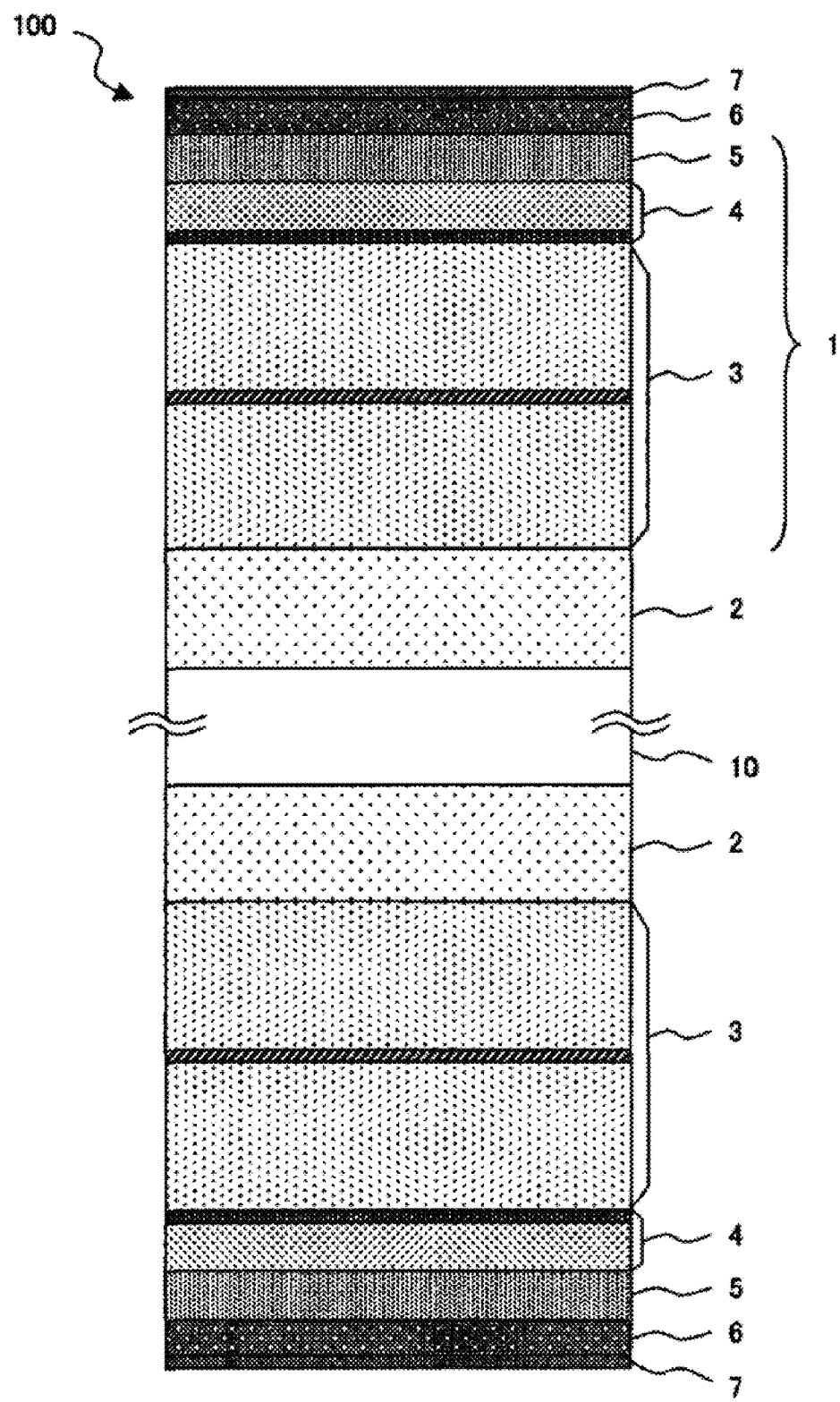
FIG. 2 is a cross-sectional view showing an arrangement of layers of the magnetic disk according to one embodiment.

FIG. 1 shows processes of the method for manufacturing the magnetic disk according to one embodiment. FIG. 2 is a cross-sectional view showing an arrangement of layers of the magnetic disk manufactured by a method, according to one embodiment. A substrate 10 may first be cleaned (step 102). For the substrate 10, a 1.8-inch aluminosilicate-based glass substrate 10 with chemically strengthened surfaces may be used. The aluminosilicate-based glass substrate 10 may have a thickness of about 0.508 mm and a surface roughness of Rp=1.8 nm and Ra=0.2 nm as measured with an atomic force microscope (hereinafter referred to as an "AFM") on 25 $\mu m^2$.

Multiple layers may then be formed on the glass substrate 10 using a sputtering system, such as a A3040 manufactured by Anelva, and the following procedures. Each of the multiple layers may be formed on both sides of the substrate simultaneously.

In step 104, the glass substrate 10 may then be loaded in a continuous multilayered sputtering system. An Al-50Ti target may be used and a DC-Power of 500 W may be applied at an Ar pressure of 0.5 Pa using a DC magnetron cathode to thereby form an adhesion layer 2 with a film thickness of about 5 nm.

Then in step 106, a soft magnetic layer 3, an underlayer 4, and a magnetic layer 5 may be formed as a magnetic recording film 1 to have the following composition and under the following process conditions. About a 30-nm-thick film of Fe-34Co-10Ta-5Zr is formed, about a 0.4-nm-thick film of Ru, and about a 30-nm-thick film of Fe-34Co-10Ta-5Zr are formed to provide the soft magnetic layer 3 of an APC (antiparallel coupling) structure. During formation of each film, the Ar pressure is kept constant at 0.5 Pa. Applied power at the DC magnetron cathode may be 850 W for Fe—Co—Ta—Zr and 40 W for Ru. The underlayer 4 of a three-layered structure of Cr-50Ti, Ni-8W, and Ru may then be formed to have a film thickness of about 2 nm for Cr—Ti, about 7 nm for Ni—W, and about 17 nm for Ru The Ar pressure is 0.5 Pa for each of the lower two layers and 7 Pa for the 8 nm of the upper Ru layer. The magnetic layer 5 of a two-layered structure of Co-17Cr18Pt-8 mol % $SiO_2$ and Co-19Cr-10Pt-3Mo is next formed to have a film thickness of about 13 nm for Co—Cr—

Pt—SiO$_2$ and 7.5 nm for Co—Cr—Pt—Mo. The film formation pressure is 4 Pa and 1 Pa and the applied power is 550 W and 250 W, respectively.

In step 108, a protective film 6 is formed by RF-CVD. During formation of a 4-nm-thick film, ethylene, hydrogen, and oxygen are used as gases and the applied power is 2100 W.

In step 110, the substrate 10 is removed from the sputtering system and a 1.1-nm-thick lubricant film 7 is formed on the protective film 6 by applying lubricant having perfluoroalkylpolyether as a main component. The lubricant is applied in an application bath in which concentration is adjusted to achieve a desired film thickness for 25 substrates accommodated per one cassette.

Figure 3:
FIG. 3 is a partly enlarged view showing a wiping cloth according to one embodiment.
Figure 3:

Cleaning is generally performed next on the lubricant film 7 using a cleaning tape to which abrasive grains are fixed. In accordance with one embodiment, however, before performing the tape cleaning, the lubricant film 7 may be wiped clean using the wiping cloth that is a woven fabric in order to remove the lubricant stain, which represents one problem to be solved by approaches of the present invention (step 112). The wiping cloth used in one embodiment is WO135 manufactured by KB Seiren, Ltd. WO135 is prepared by weaving a polyester fiber in a longitudinal direction and an 85% polyester fiber and a 15% nylon fiber in a crosswise direction as shown in FIG. 3. Of course, other fibers may also be used in conjunction with polyester and nylon.

The cleaning tape having an abrasive layer on which the abrasive grains are fixed may be used to perform tape cleaning on the lubricant film 7, so that fine protrusions that may serve as a flying impediment are removed (step 114).

In step 116, a flying inspection and an error inspection are made to complete a magnetic disk 100. The flying inspection and the error inspection will be described in detail later.

Figure 4:
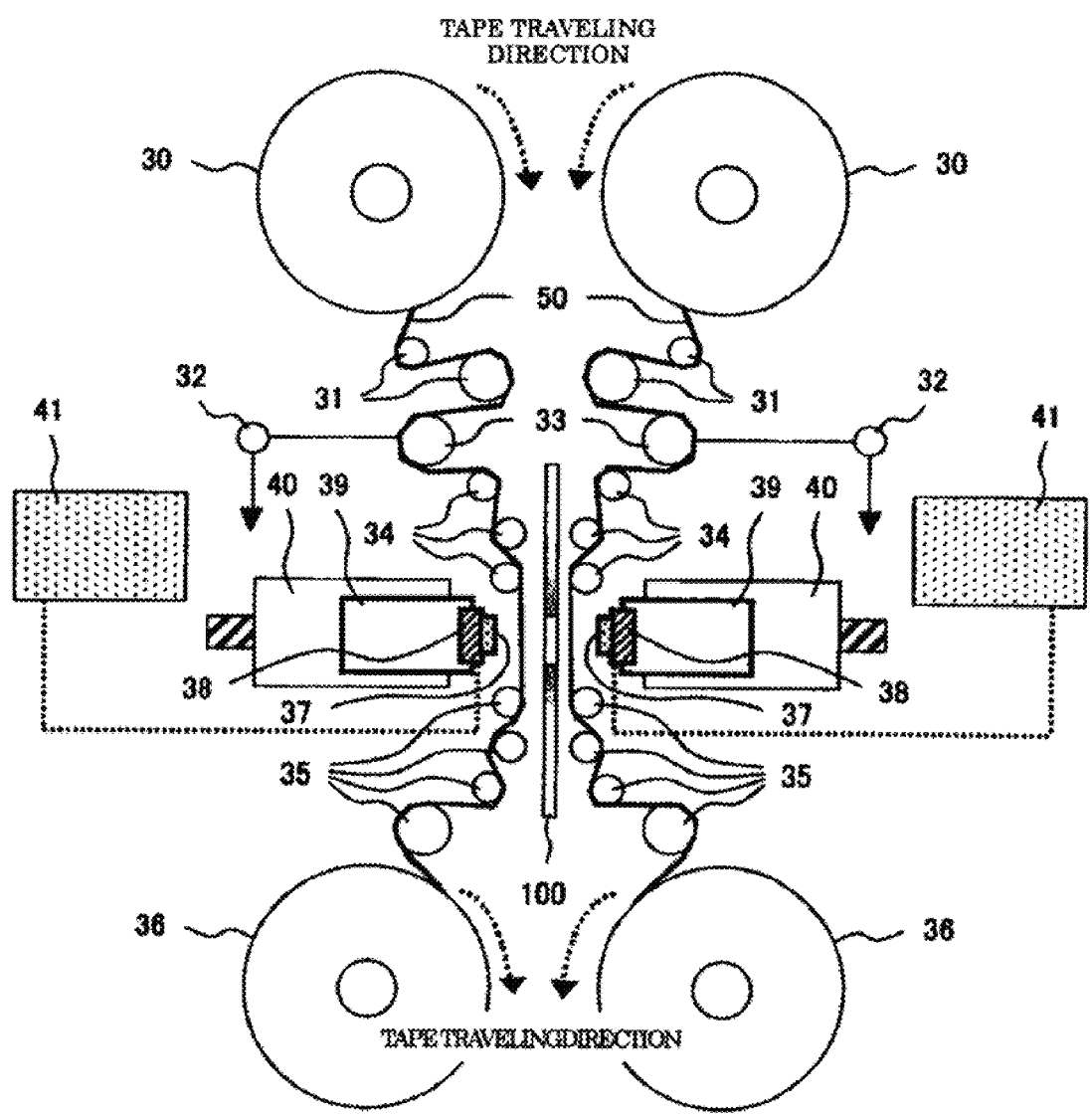
FIG. 4 is a diagram showing an arrangement of a cleaning apparatus according to one embodiment.
Figure 5:
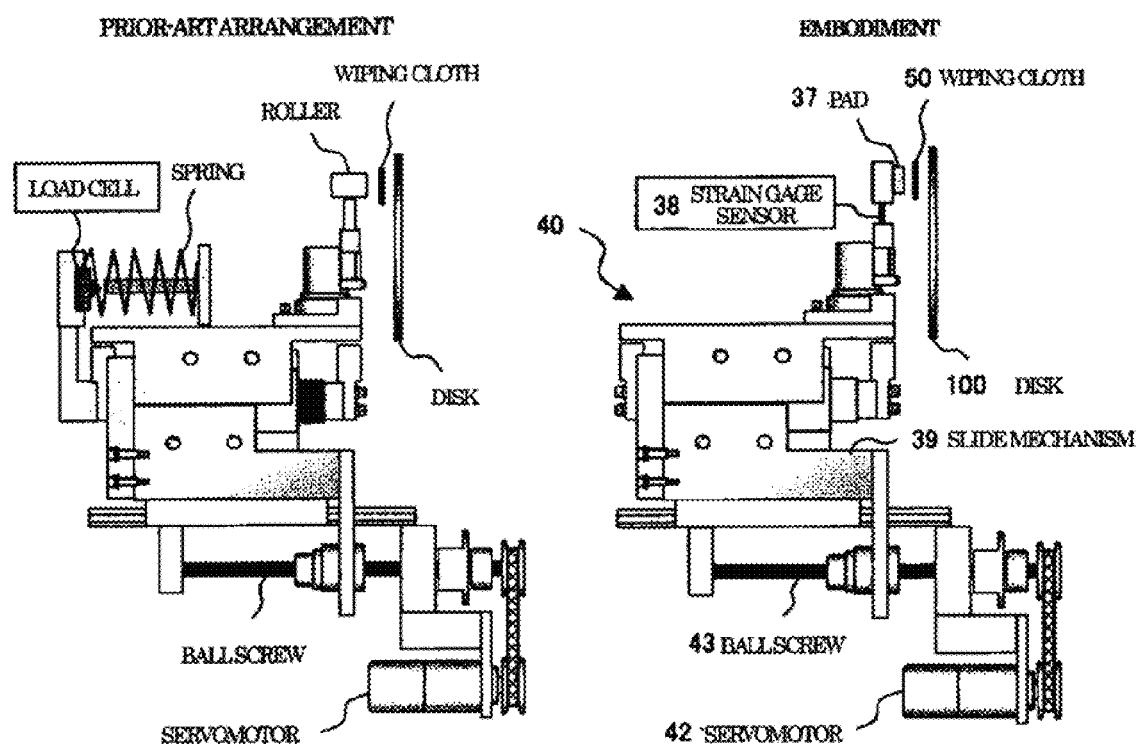
FIG. 5 is a schematic view showing a pressure mechanism, a slide mechanism, and a pad of the cleaning apparatus according to one embodiment, as compared with those of the prior art.

FIG. 4 shows a cleaning apparatus used in one embodiment. The cleaning apparatus can be used for wiping of step 112 and tape cleaning of step 114. The cleaning apparatus may be fitted with the wiping cloth if the cleaning apparatus is used for wiping and with the cleaning tape if the cleaning apparatus is used for tape cleaning. Arrangements of the cleaning apparatus fitted with the wiping cloth will be described below. The cleaning apparatus includes a pair of mechanisms for wiping both sides of the magnetic disk 100. Each of the mechanisms includes a feed reel 30, guide rollers 31, a constant tensioning mechanism 32, guide rollers 34, a pressure mechanism 40 including an elastic body (hereinafter referred to as a "pad") 37, a slide mechanism 39, and a take-up reel 36. The feed reel 30 feeds a wiping cloth 50 wound there around. The guide rollers 31 guide the wiping cloth 50 fed off from the feed reel 30. The constant tensioning mechanism 32 uses an air cylinder to apply tension, relative to a guide roller 33, to the wiping cloth 50 fed via the guide rollers 31. The guide rollers 34 guide the wiping cloth 50, to which the tension is applied, onto a surface of the magnetic disk 100. The pressure mechanism 40 uses the pad 37 to press the wiping cloth 50 guided onto the surface of the magnetic disk 100. The slide mechanism 39 slides the wiping cloth 50 pressed at predetermined pressure to the magnetic disc 100. The take-up reel 36 takes up the wiping cloth 50 that has been subjected to the wiping process via guide rollers 35. Note that FIG. 5 schematically shows the pressure mechanism 40, the slide mechanism 39, and the pad 37 according to the embodiment of the present invention, as compared with those of the prior art.

The cleaning apparatus having the arrangement as described above may apply a predetermined pressure to the wiping cloths 50 such that the wiping cloths 50 are brought into contact with corresponding surfaces of the magnetic disk 100 that is kept in a rotating condition to complete wiping of both sides of the magnetic disk 100 at the same time. The wiping cloth 50 may be about 12.6 mm wide. When the wiping cloth 50 contacts the magnetic disk 100 and the predetermined pressure is thereafter reached, the wiping cloth 50 may be moved radially from an inner peripheral side to an outer peripheral side over the magnetic disk 100. This results in the entire flying surface of the 1.8-inch diameter magnetic disk 100 being wiped properly.

An experiment was conducted with a disk rotating speed range of about 1 m/s to about 6 m/s with a sequence of a constant peripheral speed. The pressure with which the wiping cloth 50 contacts the magnetic disk surface is controlled by a control mechanism or the pressure mechanism 40 that presses the pad 37 against the disk surface at a predetermined pressure. A strain gage sensor 38 is affixed to a mounting portion of the pad 37. Pressure control may be attained through a feedback system that works as detailed in the following. Specifically, when the pad 37 contacts the magnetic disk 100 via the wiping cloth 50, a stress strain is produced in the strain gage sensor 38. A strain output is then applied as a voltage signal to an amplifier 41. The voltage signal is then converted to a corresponding pressure value. A command is then issued to a servomotor 42 so as to maintain a predetermined pressure. Of course, any other pressure control scheme may also be used, in conjunction with that described above, alone, or in conjunction with some other control scheme.

According to one embodiment, the servomotor 42 drives the pressure mechanism 40 by way of a ball screw 43. The wiping cloth 50 is pressed with a pressure of 60 gf by the pressure mechanism 40 to wipe the magnetic disk surface. Further, after the wiping operation for each disk, the wiping cloth 50 is fed over a length of the pad 37 or more, so that a clean, new face of the wiping cloth 50 is used for each disk.

A problem with the above-described wiping operation is that, as described earlier, fibers of the wiping cloth 50 may snap off to stick to the disk surface.

First, the shape of the pad 37 that presses the wiping cloth 50 is designed more effectively. Typically in prior art techniques, a rubber roller is used to press the wiping cloth. The rubber roller rotates during or after the pressing, so that the same face of the rubber roller is not used to press the wiping cloth if a plurality of disks are to be wiped continuously. Therefore, uniform pressing in the width direction can not be achieved at all times with the rubber roller. Failure to apply a uniform pressure results in pressure distribution occurring on the contact surface, which could make fibers at a high pressure zone snap easily. To ensure a uniform pressure at all times, fixed, nonrotating pads have been designed and their applicability has been examined.

Figure 6:
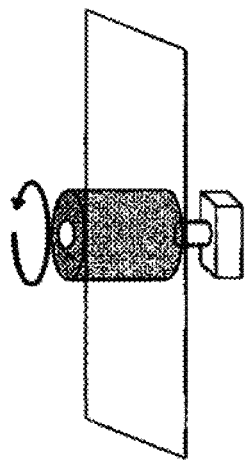
FIG. 6 includes schematic views showing pads of three different types according to several embodiments.
Figure 6:
Figure 6:
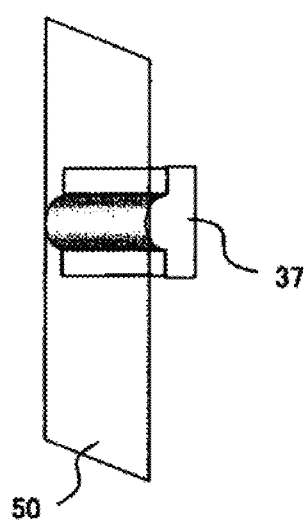

FIG. 6 schematically shows pads, according to one embodiment, which were examined. Two candidates were examined for the fixed pad: a first candidate was a flat type (comparative example) having a flat contact surface measuring 5 mm by 4 mm; and a second candidate was a semicircular type having a curved semicircular surface in contact with the wiping cloth, the contact surface measuring 1 mm by 10 mm. Ester-base polyurethane rubber having a hardness of 25 degrees (as measured at room temperature) was used for each of the rubber roller (prior art) and the fixed pads. The reason for the use of the polyurethane rubber was that the polyurethane rubber underwent smaller changes in shape relative to time during pressing as compared with the sponge. The pad undergoes small changes in shape when the rubber hardness is 20 degrees or more (as measured at room temperature), so that the pressure can be stably controlled; a hardness of 40 degrees or more, on the other hand, is generally too hard to bring the pad into uniform contact throughout its entire surface. Specifically, through advance examination, it has been discovered that the rubber with a hardness of 20 degrees to 40 degrees was appropriate for wiping. Consequently, in one embodiment, the pad made of urethane rubber with a rubber hardness of 25 degrees is used to stabilize the pressure.

Figure 7:
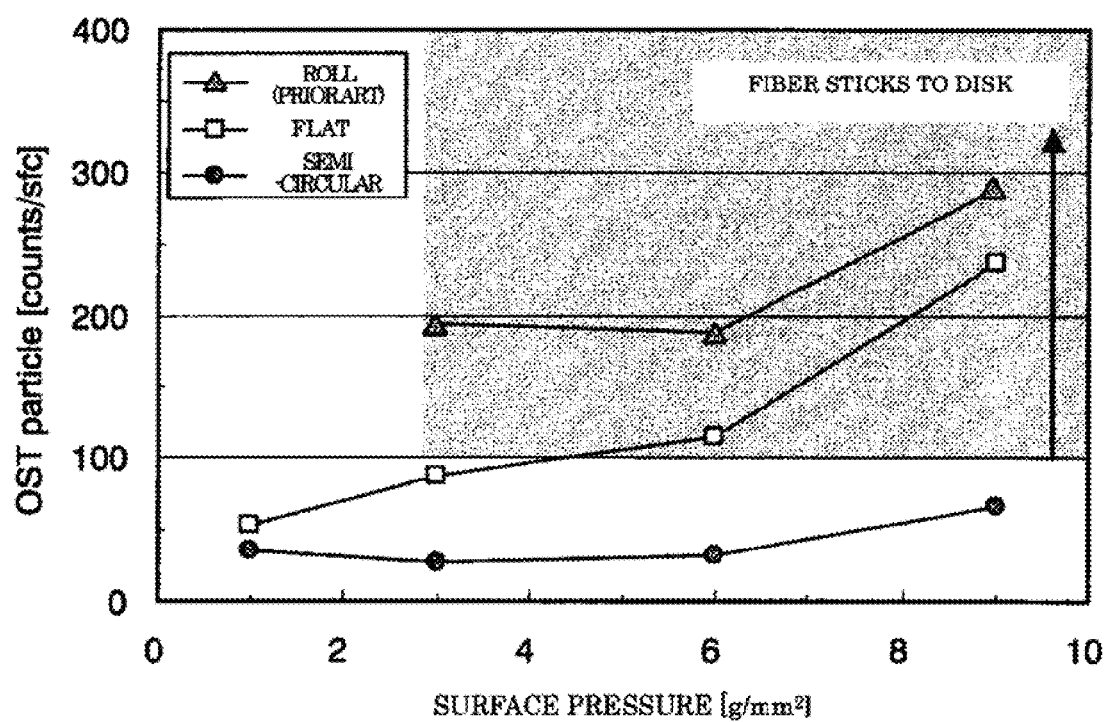
FIG. 7 is a graph showing particle counts on a disk surface after wiping using the three different types of pads shown in FIG. 6, measured with an optical defect inspection machine (OST).

FIG. 7 shows particle counts on the disk surface after wiping, measured with an optical defect inspection machine (OST manufactured by Hitachi DECO; hereinafter referred to as "OST"). FIG. 7 compares the rubber roller with the fixed pads (the flat type and the semi-circular type) in terms of the particle count relative to the pressure per unit area (hereinafter referred to as a surface pressure). It is known that the prior art rubber roller produces a higher particle count than the fixed pads. Observation of the particles revealed that a good part of the particles were stuck when wiping with cloth fibers. The rubber roller, which rotates, has only a variable contact area and therefore is unable to apply a uniform pressure. This is considered to be responsible for the fibers snapping off. When the flat type is compared with the semi-circular type, on the other hand, it has been found that the semi-circular type produces a lower particle count and has no fibers sticking. The pad having the flat contact surface to offer a large contact area has a smaller number of fibers dropping off than the rubber roller, but the fibers snap off if the surface pressure involved is high. The semi-circular type, having a small contact area like the rubber roller, permits easy adjustments for providing a uniform contact surface; further, the semicircular type uses the same contact surface to press, thus achieving uniform and stable pressure. The fibers of the wiping cloth, therefore, are difficult to snap off if used with the semi-circular type. From the foregoing discussion, the use of the semi-circular type pad enabled wiping without allowing fibers to stick to the disk. Note that another advantage of the semi-circular type pad is that a base portion included in the semi-circular type pad permits easy mounting of the pad onto the pressure mechanism. Accordingly, in the above-described discussion, the semicircular type pad having the curved semi-circular surface in contact with the wiping cloth was used; it should be noted, however, that the semi-circular type is not the only possible shape and the pad may have a convexly curved surface in contact with the wiping cloth.

Figure 8:
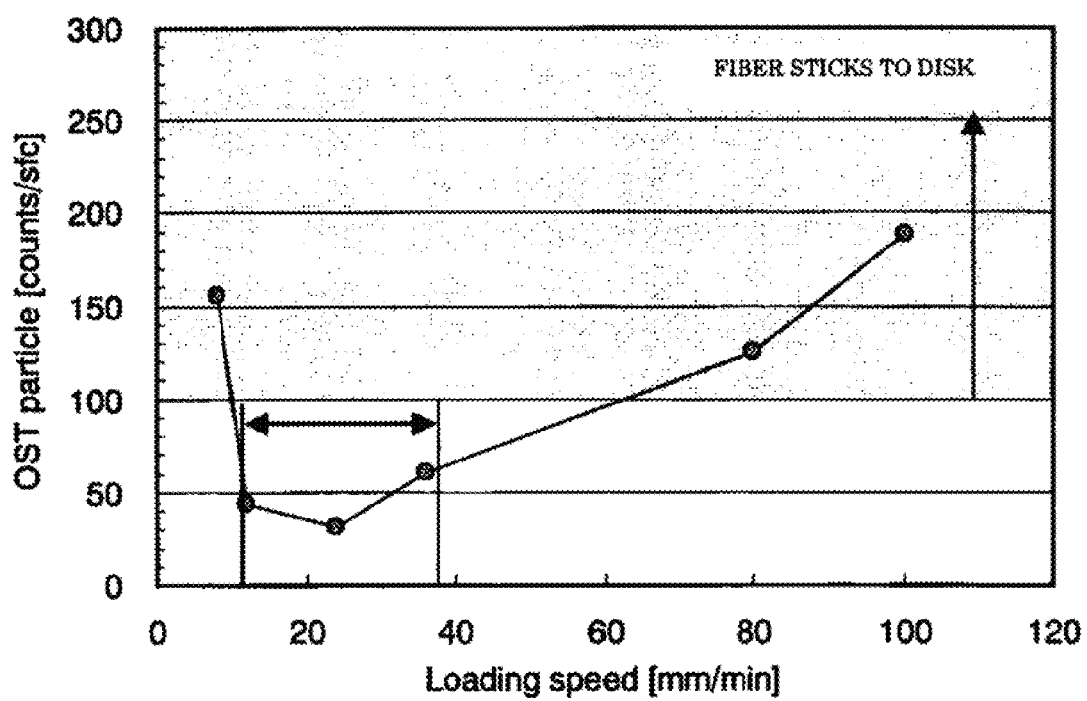
FIG. 8 is a graph showing a relationship between a wiping cloth loading speed and the particle count of the OST.

Next, the semi-circular type pad was used to examine additional wiping conditions under which the fiber was hard to snap off. FIG. 8 shows a relationship between a wiping cloth loading speed and the particle count of the OST. The wiping cloth loading speed refers to a speed at which the wiping cloth is made to contact the magnetic disk surface. It was found that wiping cloth fibers did not stick at a loading speed ranging between about 12 mm/min and about 36 mm/min. It was also found that fibers did stick even with the semi-circular type pad at a loading speed faster than 36 mm/min, and slower than 12 mm/min. Based on these results, to perform wiping without allowing fibers to stick to the disk, it is effective to control the loading speed in the range between 1 about 12 mm/min and about 36 mm/min. Note that, to control the loading speed, a mechanism is effective that directly monitors the pressure by affixing the strain gage sensor 38 to the mounting portion of the pad 37 as shown in FIG. 5. Loading speed control is difficult with a prior art system that indirectly monitors the pressure via a spring.

Based on the results of the foregoing discussion, the following are results of wiping performed at a loading speed of 24 mm/min, using the semi-circular type pad in order to remove the lubricant stain from the magnetic disk surface.

Figure 9:
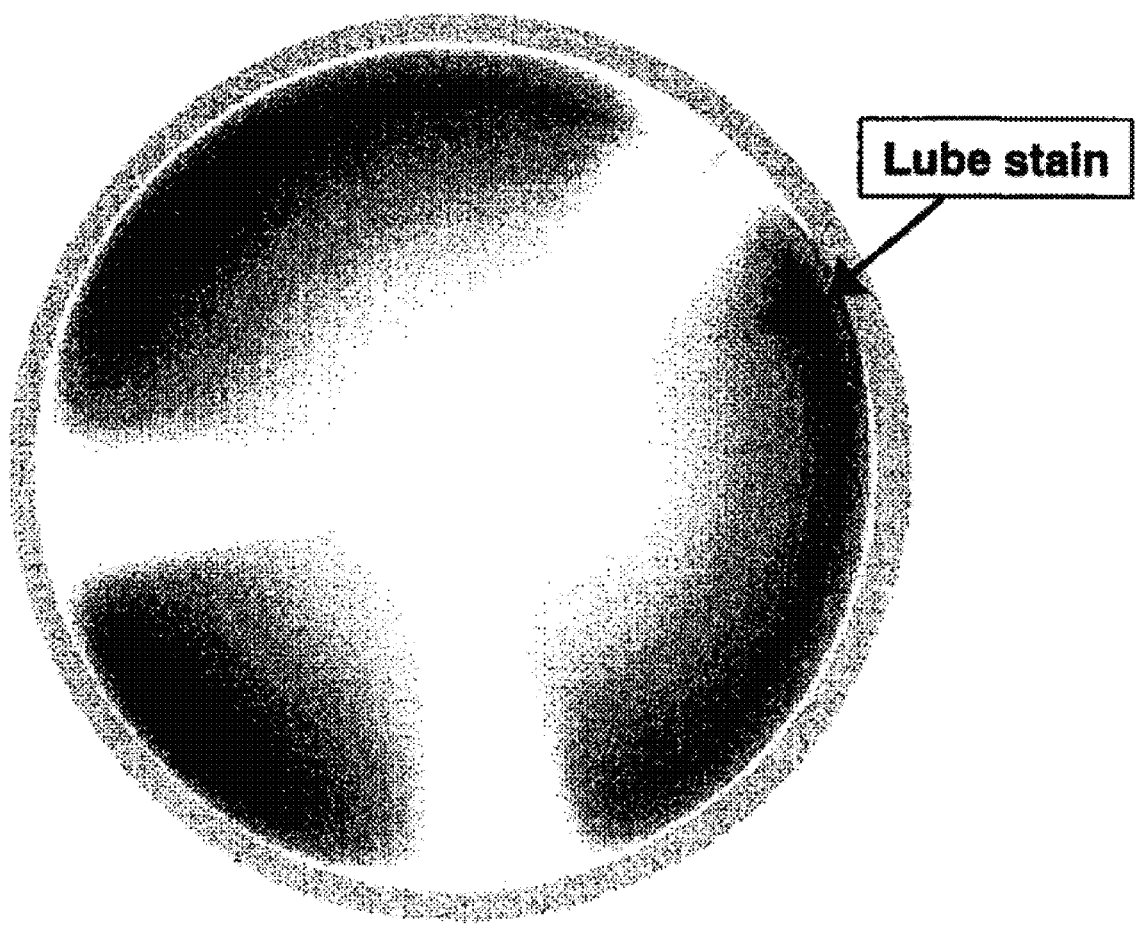
FIG. 9 is a schematic view showing the magnetic disk surface to which a lubricant layer has been applied, measured with an optical surface analyzer.
Figure 10:
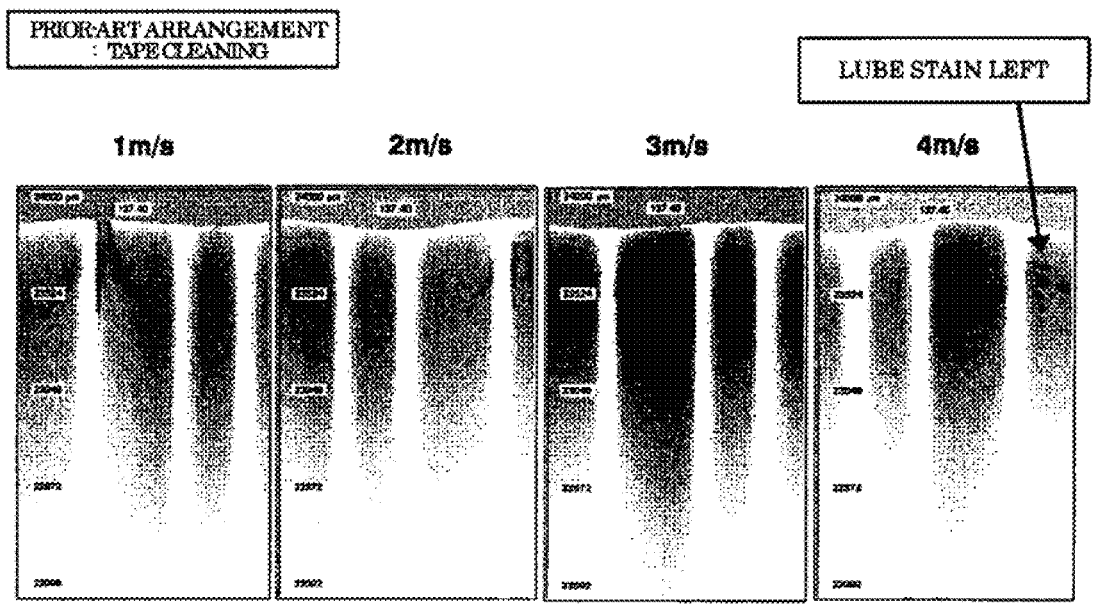
FIG. 10 compares Candela images after a prior art tape cleaning with those after the wiping according to one embodiment relative to varying disk speeds.
Figure 10:
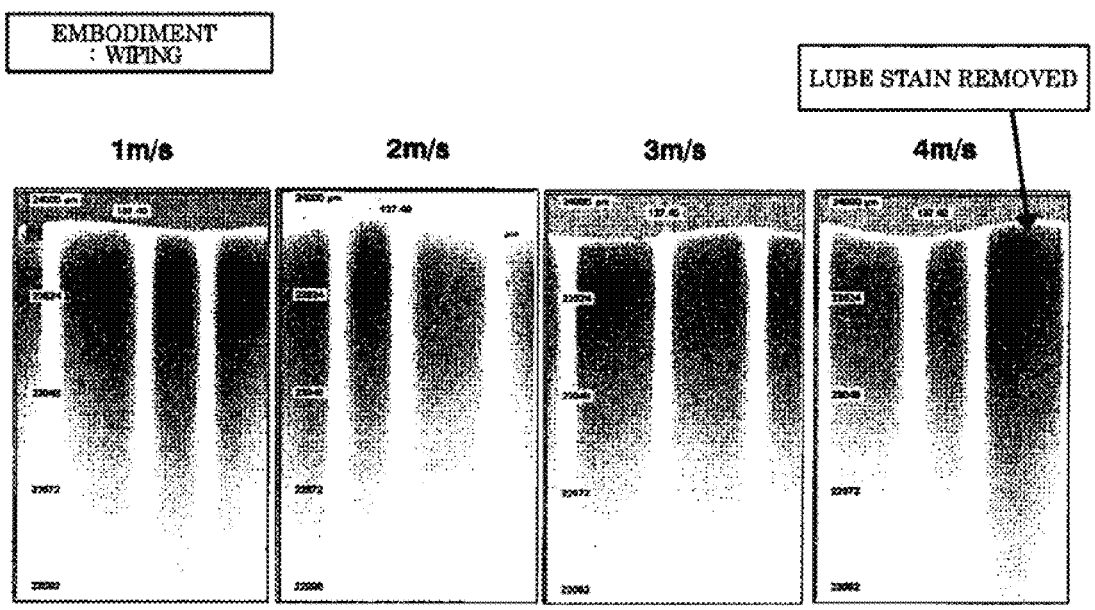

FIG. 9 is a schematic view showing the magnetic disk surface to which the lubricant has been applied measured with the optical surface analyzer manufactured by KLATencor (Candela 6120) in the Q-phase channel. The Q-phase image can show thickness of the lubricant in varying shades of gray. FIG. 9 shows darker portions (stain) in a peripheral direction of the Q-phase image on an outer peripheral end of the magnetic disk. A comparison was made of the lubricant stain after the cleaning using the prior art cleaning tape to which abrasive grains are fixed and after the wiping according to one embodiment. FIG. 10 compares Candela images after the prior art tape cleaning with those after the wiping according to one embodiment relative to varying disk speeds. Note that, for the prior art cleaning tape, model AWA 15000-25 TSY-A manufactured by Nihon Micro Coating Co., Ltd. was used, the model being a PET film on which alumina abrasive grains with an average particle diameter of 0.3 μm were fixed and a mortar-shaped polygon cell called Bernard cell was formed. It was found that, as compared with the prior art tape cleaning, the wiping according to one embodiment was more effective in removing the lubricant stain. It was also found that the faster the magnetic disk speed, the more the lubricant stain could be removed and the lubricant stain could be completely removed with a disk speed of about 3 m/s or more during wiping.

Figure 11:
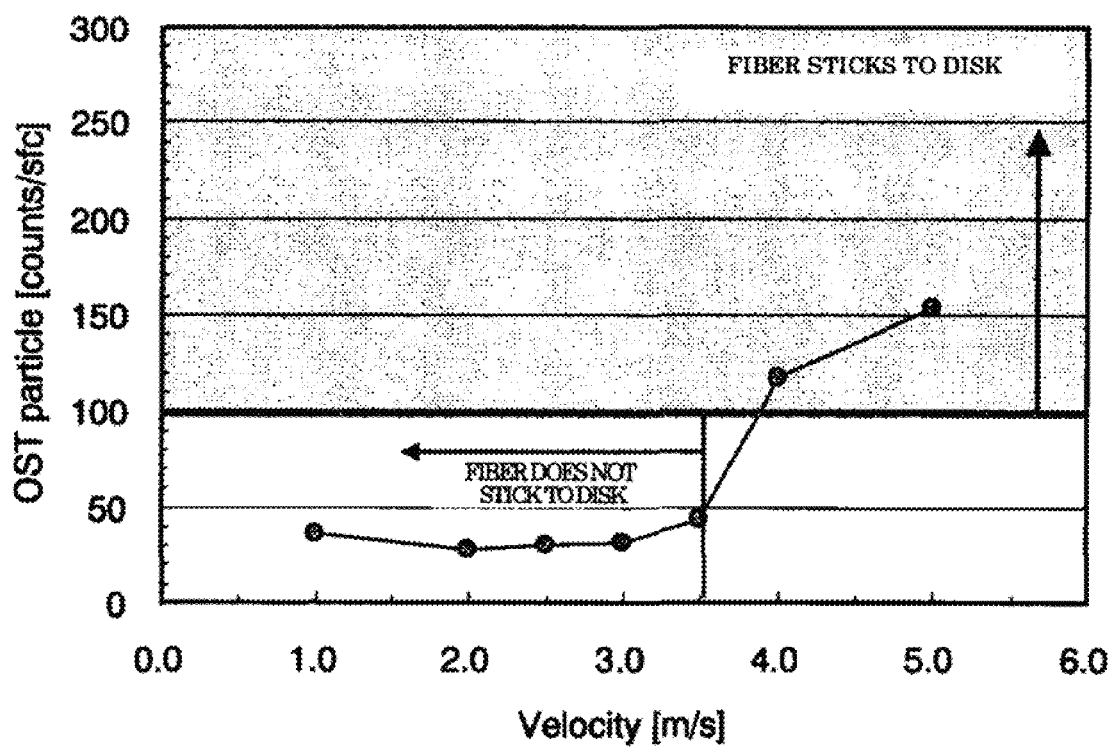
FIG. 11 is a graph showing the OST particle counts after wiping relative to varying disk speeds.

FIG. 11 shows the OST particle counts after wiping relative to varying disk speeds. It was observed that the particle count increased and fibers stuck on the disk surface with a speed of about 4 m/s or more. This is probably because a higher speed causes the wiping cloth fiber to be snapped off by friction, sticking to the magnetic disk surface. From the foregoing discussion, it was found that the wiping was more effective than the prior art tape cleaning for effectively wiping the lubricant stain on the outer peripheral end of the magnetic disk and wiping with a disk speed of about 3.0 m/s to about 3.5 m/s was effective to ensure that no wiping cloth fibers stuck to the disk.

Specifically, wiping may be performed using the wiping cloth to wipe the surface clean of the lubricant stain that can be a cause of reduced output of the inspection magnetic head, so that the lubricant becomes difficult to stick to the inspection magnetic head and the read output is not reduced. Tape cleaning may next be performed using the cleaning tape to which abrasive grains are fixed to effectively remove protrusions and particles that serve as flying impediments, so that yield can be improved in flying inspection and error inspection in the magnetic disk mass-production processes.

Results of a flying inspection and an error inspection conducted by combining the wiping and tape cleaning under conditions optimized through above-described discussion are described below. Two types of comparative samples were prepared: (1) prior art tape cleaning only; and (2) tape cleaning performed following the wiping according to one embodiment. For the prior art tape cleaning conditions, the rubber roller pressure was 60 gf and the magnetic disk speed was 4 m/s. For wiping conditions using the semi-circular type pad, the pressure was 60 gf, the wiping cloth loading speed was 24 mm/min, and the disk speed was 3 m/s. A comparative evaluation was made for the flying inspection and the error inspection of the inspection magnetic head using a tester manufactured by Hitachi DECO in the mass-production line.

Figure 12:
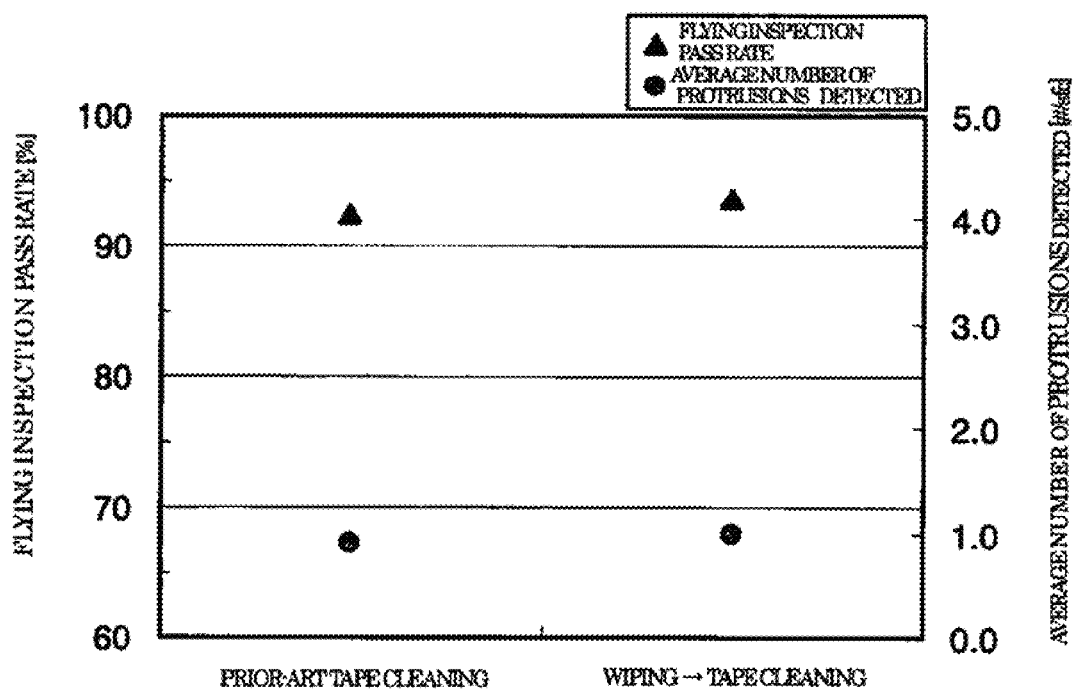
FIG. 12 is a graph showing a pass rate of a flying inspection and an average number of protrusions detected of an inspection magnetic head according to one embodiment and a prior art arrangement.

FIG. 12 shows the pass rate of the flying inspection and the average number of protrusions detected of the inspection magnetic head (piezo element-mounted head). When results of (1) prior art tape cleaning only are compared with those of (2) tape cleaning performed following the wiping according to one embodiment, the average number of protrusions detected on the inspection magnetic head and the flying inspection pass rate are equal to each other.

Figure 13:
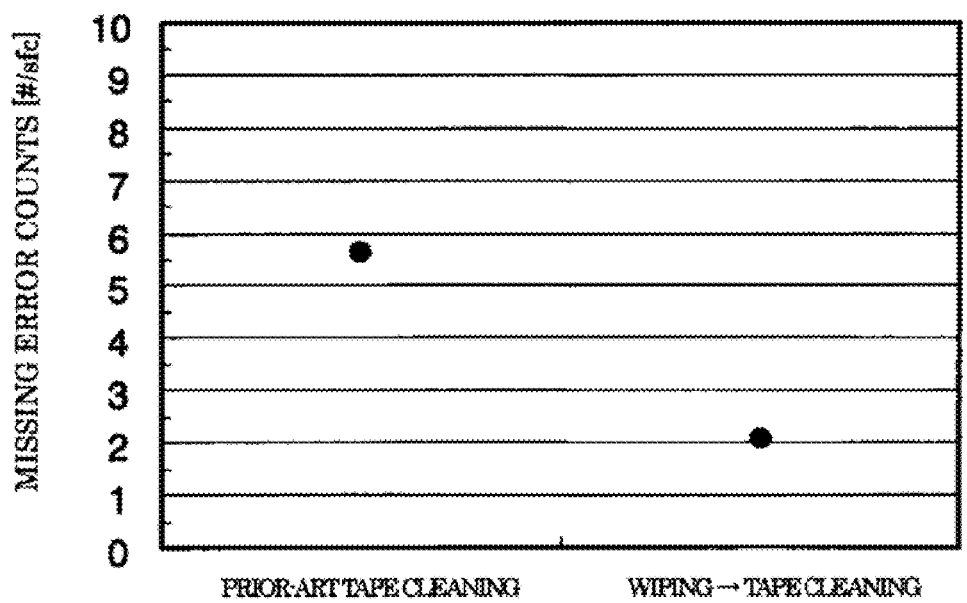
FIG. 13 includes graphs showing defect rates and error inspection pass rates when missing error counts and read outputs are reduced to a clip level or lower according to one embodiment and a prior art arrangement.
Figure 13:
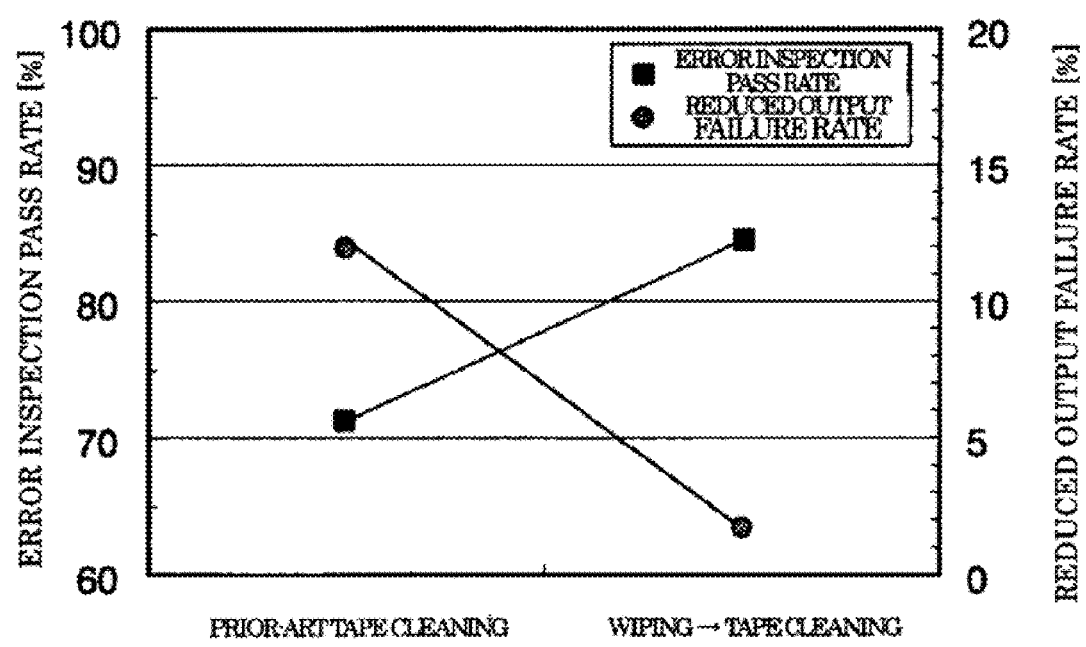

FIG. 13 shows defect rates and error inspection pass rates when missing error counts and read outputs are reduced to a clip level or lower. A comparison made between (1) and (2) showed that the missing error counts were reduced to about ⅓ and the defect rate of read output was reduced by about 10% in the tape cleaning following the wiping according to one embodiment as compared with the prior art tape cleaning only. As a result, the error inspection pass rate improved by about 13%. The prior art tape cleaning removes protrusions and particles at the same time, so that particles pinched between the cleaning tape and the disk damage the recording film (minor scratches occur). This increases the likelihood of the missing error occurring. The wiping performed before the tape cleaning according to one embodiment, on the other hand, allows the wiping cloth fiber to trap and remove particles from the magnetic disk surface. Accordingly, there is a significantly small likelihood of the particles being pinched between the cleaning tape and the disk surface during tape cleaning and it is estimated that the missing error count was reduced thanks to the minor damage (scratches) not occurring. In addition, the wiping action wiped the outer peripheral end of the magnetic disk clean of the lubricant stain as described earlier. It can therefore be considered that the lubricant could be inhibited from sticking to the inspection magnetic head, the flying performance of the inspection magnetic head could be stabilized even if the number of magnetic disks to be inspected was accumulated, and the read output would not be reduced. The error inspection pass rate could be significantly improved through the foregoing effects also.

Note that the above-described cleaning apparatus may be used for tape cleaning by mounting a feed reel loaded with a cleaning tape instead of the wiping cloth. The cleaning tape herein includes an abrasive layer on which abrasive grains are fixed. Another possible configuration for the cleaning apparatus includes a pair of mechanisms for wiping both sides of the magnetic disk and another pair of mechanisms for tape-cleaning both sides of the magnetic disk, the two sets of the pair of mechanisms being disposed around the magnetic disk.

The following list is a description of the reference numerals and signs, and is provided for quick reference to the references consistent throughout the various figures included herein:
1: magnetic recording film
2: adhesion layer
3: soft magnetic layer
4: underlayer
5: magnetic layer
6: protective film
7: lubricant film
10: substrate
30: feed reel
31, 33, 34, 35: guide roller
32: constant tensioning mechanism
36: take-up reel
37: pad
38: strain gage sensor
39: slide mechanism
40: pressure mechanism
41: amplifier
42: servomotor
43: ball screw
50: wiping cloth
100: magnetic disk It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
    a mechanism for supporting and rotating a magnetic disk; and
    at least one pair of mechanisms for wiping or tape-cleaning both sides of the magnetic disk, each of the pair of mechanisms including:
        a feed reel and a take-up reel for a wiping cloth or a cleaning tape;
        a plurality of guide rollers between the feed reel and the take-up reel for guiding the wiping cloth or the cleaning tape onto a surface of the magnetic disk;
        a mechanism for controlling tension in the wiping cloth or the cleaning tape between the guide rollers to a predetermined level;
        a pressure mechanism for pressing a pad mounted with a strain gage sensor against the wiping cloth or the cleaning tape guided onto the surface of the magnetic disk; and
        a control mechanism for controlling a pressure on the pad at least partially based on a strain output of the strain gage sensor.

2. The apparatus according to claim 1, wherein the wiping cloth is wound around the feed reel and the pad includes a convexly curved surface that is in contact with the wiping cloth if the at least one pair of mechanisms for wiping or tape-cleaning both sides of the magnetic disk wipes both sides of the magnetic disk.

3. The apparatus according to claim 2, wherein the pad is semi-circular.

4. The apparatus according to claim 2, wherein the pad comprises an ester-based polyurethane rubber having a hardness of about 20 degrees to about 40 degrees.

5. The apparatus according to claim 2, wherein the wiping cloth comprises a woven fabric of at least a polyester fiber and a nylon fiber.

6. The apparatus according to claim 1, wherein the control mechanism detects a strain output from the strain gage sensor, converts the strain output to a corresponding voltage signal, and feeds the signal back to a servomotor to control the pressure of the pad to a predetermined value.

7. The apparatus according to claim 1, wherein two pairs of mechanisms for wiping or tape-cleaning both sides of the magnetic disk are disposed on either side of the magnetic disk, wherein one is disposed for wiping both sides of the magnetic disk and the other is disposed for tape-cleaning both sides of the magnetic disk.

8. A method for using the apparatus of claim 1, the method comprising:
    forming a lubricant film on the magnetic disk, the magnetic disk having a substrate, at least a magnetic recording film above the substrate, and a protective film above the magnetic recording film;
    wiping the lubricant film using the pair of mechanisms for wiping or tap-cleaning while rotating the magnetic disk by pressing the pad against the wiping cloth using the pressure mechanism, wherein the pad has a convexly curved surface in contact with the wiping cloth, and wherein the wiping cloth is disposed so as to oppose the lubricant film; and using the pressure mechanism to press the cleaning tape which includes abrasive grains against the substrate on which the protective film and lubricant film are formed while rotating the magnetic disk to remove protrusions.

9. The method according to claim 8, wherein the pad is semi-circular.

10. The method according to claim 8, wherein a surface of the pad in contact with the wiping cloth has a width of about 1 mm in a traveling direction of the wiping cloth and a width of about 10 mm in a direction perpendicular to the traveling direction of the wiping cloth.

11. The method according to claim 10, wherein the wiping cloth is about 12.6 mm wide and moved from an inner peripheral side to an outer peripheral side of the substrate.

12. The method according to claim 8, wherein the pad comprises ester-based polyurethane rubber having a hardness of about 20 degrees to about 40 degrees.

13. The method according to claim 8, wherein the wiping cloth comprises a woven fabric of at least a polyester fiber and a nylon fiber.

14. The method according to claim 8, wherein the wiping cloth is pressed against the substrate in a traveling direction of the substrate.

15. The method according to claim 8, further comprising:
forming at least the magnetic recording film above a substrate; and
forming a protective film above the magnetic recording film.

16. The method according to claim 15, wherein the forming at least a magnetic recording film above the substrate further includes:
forming a soft magnetic layer above an underlayer; and
forming a magnetic layer on the soft magnetic layer.

17. The method according to claim 8, wherein the lubricant film is wiped while rotating the substrate at about 3.0 m/s to about 3.5 m/s.

18. The method according to claim 8, wherein the pad is pressed against a wiping cloth at the loading speed of about 12 mm/min to about 36 mm/min under a pressure of about 3 gf/mm$^2$ to about 9 gf/mm$^2$.

19. A method using the apparatus to of claim 1, the method comprising:
forming a lubricant film on the magnetic disk, the magnetic disk having a substrate, at least a magnetic recording film above the substrate, and a protective film above the magnetic recording film;
wiping the lubricant film while rotating the magnetic disk on the mechanism for supporting and rotating the magnetic disk at about 3.0 m/s to about 3.5 m/s by pressing the pad against the wiping cloth at a loading speed of about 12 mm/min to about 36 mm/min under a pressure of about 3 gf/mm$^2$ to about 9 gf/mm$^2$, wherein the pad has a convexly curved surface in contact with the wiping cloth, and wherein the wiping cloth is disposed so as to oppose the lubricant film; and
using the pressure mechanism to press the cleaning tape which includes abrasive grains against the substrate on which the protective film and lubricant film are formed while rotating the magnetic disk to remove protrusions.

* * * * *

UNITED STATES PATENT AND TRADEMARK OFFICE
CERTIFICATE OF CORRECTION

PATENT NO. : 8,388,414 B2
APPLICATION NO. : 12/568437
DATED : March 5, 2013
INVENTOR(S) : Endou et al.

It is certified that error appears in the above-identified patent and that said Letters Patent is hereby corrected as shown below:

In the specification:

col. 1, line 57 replace "JP-A-200'-67655" with --JP-A-2001-67655--.

Signed and Sealed this
Fourteenth Day of May, 2013

Teresa Stanek Rea
*Acting Director of the United States Patent and Trademark Office*